US012633710B2

(12) United States Patent
Durse et al.

(10) Patent No.: US 12,633,710 B2
(45) Date of Patent: May 19, 2026

(54) FLEXIBLE ELECTRICAL BUS BAR AND METHOD OF MANUFACTURING THE SAME

(71) Applicant: Aptiv Technologies AG, Schaffhausen (CH)

(72) Inventors: Nicholas A. Durse, Youngstown, OH (US); Steven W. Marzo, Cortland, OH (US); Jonathan D. Weidner, Conneautville, PA (US); David R. Peterson, Aurora, OH (US)

(73) Assignee: Aptiv Technologies AG, Schaffhausen (CH)

( * ) Notice: Subject to any disclaimer, the term of this patent is extended or adjusted under 35 U.S.C. 154(b) by 268 days.

(21) Appl. No.: 18/244,990

(22) Filed: Sep. 12, 2023

(65) Prior Publication Data

US 2024/0006831 A1     Jan. 4, 2024

Related U.S. Application Data

(63) Continuation of application No. 17/592,701, filed on Feb. 4, 2022, now Pat. No. 11,791,597.

(60) Provisional application No. 63/146,050, filed on Feb. 5, 2021.

(51) Int. Cl.
H01R 25/14 (2006.01)
H02G 5/00 (2006.01)

(52) U.S. Cl.
CPC ............. H01R 25/14 (2013.01); H02G 5/005 (2013.01)

(58) Field of Classification Search
None
See application file for complete search history.

(56) References Cited

U.S. PATENT DOCUMENTS

| | | | |
|---|---|---|---|
| 911,844 | A | 2/1909 | Schoenberg |
| 2,062,752 | A | 12/1936 | Frank |
| 2,190,196 | A | 2/1940 | Waldimir |
| 2,680,233 | A | 6/1954 | McFarlin |
| 3,132,203 | A | 5/1964 | Ecker |
| 3,202,756 | A | 8/1965 | Stanback |
| 3,296,365 | A | 1/1967 | Basile |

(Continued)

FOREIGN PATENT DOCUMENTS

| | | | | |
|---|---|---|---|---|
| BR | 8803848 | A | 5/1989 | |
| CN | 115986453 | A * | 4/2023 | ............. H01R 13/20 |

(Continued)

OTHER PUBLICATIONS

"Extended European Search Report mailed on Jul. 7, 2022", 9 pages.

*Primary Examiner* — Timothy J. Dole
*Assistant Examiner* — Muhammed Azam
(74) *Attorney, Agent, or Firm* — Billion & Armitage

(57) ABSTRACT

An electrical bus bar assembly includes an elongate flexible electrical conductor formed from a strip of electrically conductive material having a distal portion that defines two parallel tabs extending from the conductor, and an electrical terminal having two different parallel sides received between the tabs. The tabs flex to resiliently retain the terminal, providing a low-resistance electrical interface and accommodating terminals of varying thicknesses. This arrangement enables simplified assembly and reliable electrical connections in compact power distribution systems.

15 Claims, 12 Drawing Sheets

(56)           References Cited

U.S. PATENT DOCUMENTS

| | | | |
|---|---|---|---|
| 3,310,772 A * | 3/1967 | Kirk | H01R 24/76 |
| | | | 439/852 |
| 3,382,118 A | 5/1968 | Stanback | |
| 3,459,880 A | 8/1969 | Erdle | |
| 3,466,382 A | 9/1969 | Rocklitz | |
| 3,609,215 A | 9/1971 | Giger et al. | |
| 3,639,680 A | 2/1972 | Dempsey et al. | |
| 3,644,663 A | 2/1972 | Carlson | |
| 3,662,088 A | 5/1972 | Wright et al. | |
| 3,818,119 A | 6/1974 | Sutherland et al. | |
| 3,818,122 A | 6/1974 | Luetzow | |
| 3,878,341 A | 4/1975 | Balde | |
| 4,002,388 A | 1/1977 | Menocal | |
| 4,113,981 A | 9/1978 | Fujita et al. | |
| 4,262,163 A | 4/1981 | Durrell et al. | |
| 4,346,257 A | 8/1982 | Moss et al. | |
| 4,437,138 A | 3/1984 | Nicol | |
| 4,461,076 A | 7/1984 | Plummer | |
| 4,578,529 A | 3/1986 | Look | |
| 4,595,635 A | 6/1986 | Dubrow et al. | |
| 4,919,628 A * | 4/1990 | Mobley | H01R 13/113 |
| | | | 439/852 |
| 4,983,128 A * | 1/1991 | Dale | H02B 1/20 |
| | | | 439/111 |
| 5,134,252 A | 7/1992 | Himeno et al. | |
| 5,184,280 A | 2/1993 | Fouad | |
| 5,274,195 A | 12/1993 | Murphy et al. | |
| 5,626,492 A | 5/1997 | Onizuka et al. | |
| 5,666,723 A * | 9/1997 | Ohtaka | H01R 13/113 |
| | | | 29/874 |
| 6,203,343 B1 | 3/2001 | Chevassus-More et al. | |
| 6,234,851 B1 | 5/2001 | Phillips | |
| 6,238,225 B1 | 5/2001 | Middlehurst et al. | |
| 6,297,452 B1 | 10/2001 | Pernot | |
| 6,320,130 B1 | 11/2001 | Takahashi | |
| 6,325,640 B1 | 12/2001 | Kasai | |
| 6,428,335 B1 | 8/2002 | Bader et al. | |
| 6,685,514 B2 * | 2/2004 | Costa | H01R 4/625 |
| | | | 439/876 |
| 6,736,648 B2 * | 5/2004 | Terunuma | H01R 9/226 |
| | | | 439/76.2 |
| 7,256,345 B2 | 8/2007 | Inoue | |
| 7,786,625 B2 | 8/2010 | Huang et al. | |
| 7,819,707 B2 * | 10/2010 | Aoki | H01R 13/113 |
| | | | 439/727 |
| 8,299,360 B2 | 10/2012 | Sato et al. | |
| 9,033,721 B2 | 5/2015 | Graf et al. | |
| 9,065,192 B2 * | 6/2015 | Zhao | H01R 13/415 |
| 9,147,506 B2 * | 9/2015 | Okada | B21F 5/00 |
| 9,238,441 B2 | 1/2016 | Füssl et al. | |
| 9,358,936 B2 | 6/2016 | Adachi et al. | |
| 9,490,551 B2 * | 11/2016 | Hirooka | H01R 4/646 |
| 9,620,263 B2 | 4/2017 | Ogawa et al. | |
| 9,825,377 B2 | 11/2017 | Nishikawa et al. | |
| 9,853,435 B1 | 12/2017 | Burkman | |
| 9,928,939 B1 * | 3/2018 | Volpone | H01R 9/031 |
| 10,020,613 B2 * | 7/2018 | Lyon | H01R 13/6616 |
| 10,153,570 B2 * | 12/2018 | Coakley | H01R 12/69 |
| 10,224,702 B1 | 3/2019 | Soto Ruvalcaba et al. | |
| 10,243,191 B2 | 3/2019 | Mattmuller et al. | |
| 10,476,190 B2 * | 11/2019 | Horiuchi | H01R 13/11 |
| 10,734,176 B2 | 8/2020 | Kamenšek et al. | |
| 10,854,865 B2 * | 12/2020 | Wang | H01M 50/562 |

| | | | |
|---|---|---|---|
| 10,938,125 B2 * | 3/2021 | Yamada | H01R 4/023 |
| 11,031,743 B2 | 6/2021 | Yanagida et al. | |
| 11,070,001 B2 * | 7/2021 | Kitai | F02D 9/10 |
| 11,139,646 B2 | 10/2021 | Koizumi et al. | |
| 11,145,996 B2 * | 10/2021 | Yamashita | H01R 4/06 |
| 11,211,735 B2 * | 12/2021 | Kobayashi | H01R 13/44 |
| 11,476,654 B2 | 10/2022 | Koizumi et al. | |
| 11,791,597 B2 * | 10/2023 | Durse | H01R 25/14 |
| | | | 174/68.2 |
| 2001/0012736 A1 | 8/2001 | Miyajima et al. | |
| 2001/0027872 A1 | 10/2001 | Wagener | |
| 2003/0102148 A1 | 6/2003 | Ohara et al. | |
| 2010/0319958 A1 | 12/2010 | Latimer | |
| 2012/0302110 A1 | 11/2012 | Altrichter | |
| 2013/0000971 A1 | 1/2013 | Sakaki et al. | |
| 2013/0068495 A1 | 3/2013 | Hadi et al. | |
| 2013/0102205 A1 | 4/2013 | Onoda | |
| 2013/0292156 A1 | 11/2013 | Okada et al. | |
| 2016/0217884 A1 | 7/2016 | Harwath | |
| 2016/0233649 A1 | 8/2016 | Baillargeon et al. | |
| 2016/0285176 A1 | 9/2016 | Castonguay et al. | |
| 2018/0097322 A1 | 4/2018 | Harris | |
| 2018/0148855 A1 | 5/2018 | Nakagawa et al. | |
| 2018/0301832 A1 * | 10/2018 | Coakley | H01R 12/69 |
| 2018/0315517 A1 | 11/2018 | Fukawa et al. | |
| 2018/0316146 A1 | 11/2018 | Kato et al. | |
| 2019/0126860 A1 | 5/2019 | Takamatsu et al. | |
| 2019/0181599 A1 | 6/2019 | Guillanton et al. | |
| 2019/0348828 A1 | 11/2019 | Preising et al. | |
| 2020/0194977 A1 | 6/2020 | Furco et al. | |
| 2020/0273599 A1 | 8/2020 | Imamura et al. | |
| 2020/0389005 A1 | 12/2020 | Koizumi et al. | |
| 2021/0126408 A1 | 4/2021 | Furco et al. | |
| 2021/0399539 A1 | 12/2021 | Koizumi et al. | |
| 2023/0009132 A1 | 1/2023 | Guillanton et al. | |
| 2025/0007187 A1 * | 1/2025 | Morello | H01R 9/0518 |

FOREIGN PATENT DOCUMENTS

| | | | |
|---|---|---|---|
| DE | 202017102148 U1 | 5/2017 |
| DE | 202019100376 U1 | 2/2019 |
| DE | 102020102487 B4 | 1/2022 |
| EP | 1311045 A1 | 5/2003 |
| EP | 3477807 A1 | 5/2019 |
| FR | 2492575 A1 | 4/1982 |
| GB | 675126 A | 7/1952 |
| GB | 2166914 A | 5/1986 |
| IT | UB20160023 A1 | 7/2017 |
| KR | 20090005948 U | 6/2009 |
| KR | 20160049260 A | 5/2016 |
| KR | 20160081066 A | 7/2016 |
| KR | 20170079582 A | 7/2017 |
| KR | 20180122458 A | 11/2018 |
| KR | 20200116880 A | 10/2020 |
| KR | 20200116881 A | 10/2020 |
| KR | 20210019296 A | 2/2021 |
| WO | 9215127 A1 | 9/1992 |
| WO | 9429885 A1 | 12/1994 |
| WO | 9931777 A1 | 6/1999 |
| WO | 0186770 A2 | 11/2001 |
| WO | 2012118046 A1 | 9/2012 |
| WO | 2016133861 A1 | 8/2016 |
| WO | 2018114684 A1 | 6/2018 |
| WO | 2019201429 A1 | 10/2019 |

* cited by examiner

126

126

120

120

126

126

120

126

110

110

126

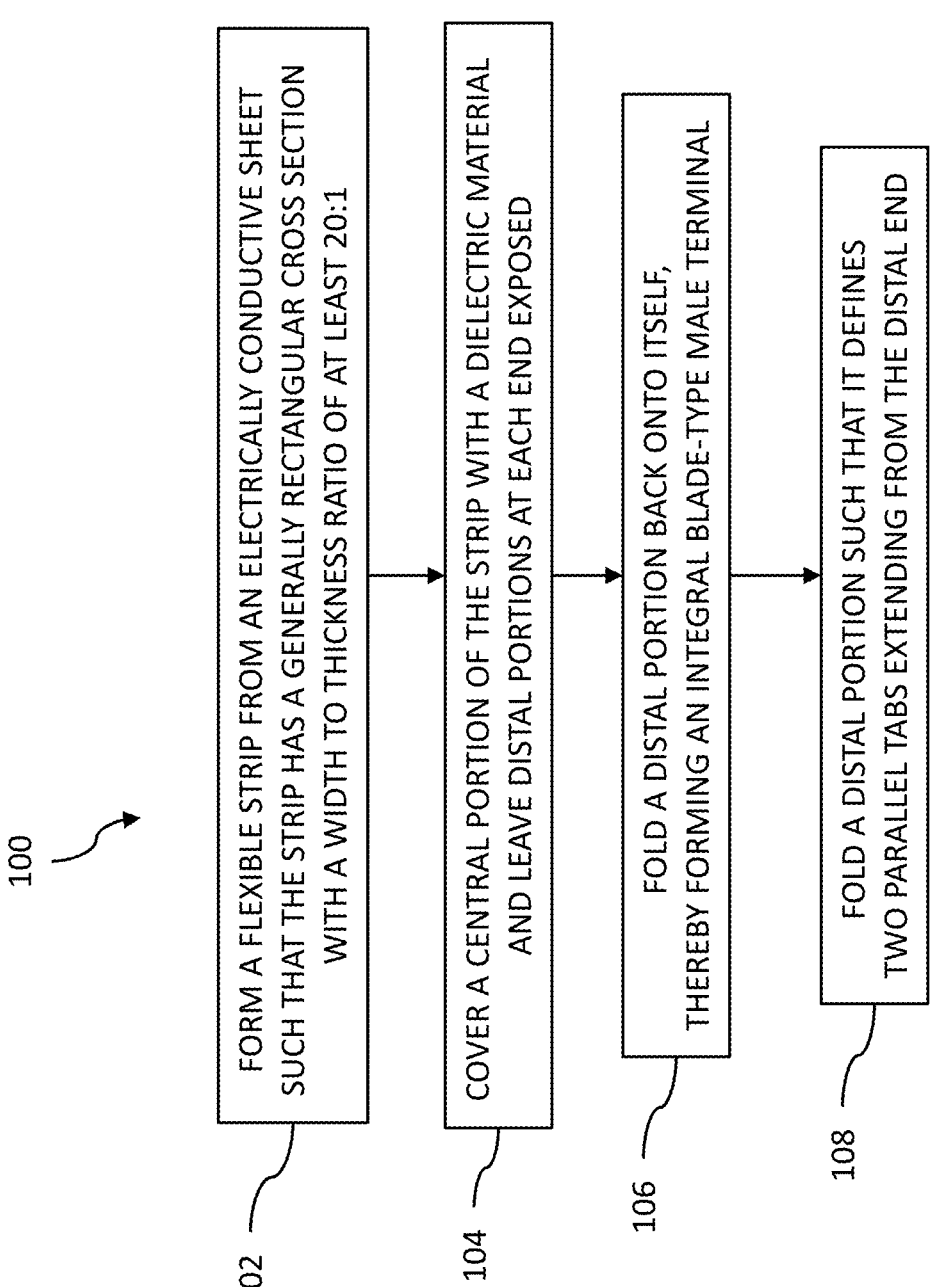

100

102 FORM A FLEXIBLE STRIP FROM AN ELECTRICALLY CONDUCTIVE SHEET SUCH THAT THE STRIP HAS A GENERALLY RECTANGULAR CROSS SECTION WITH A WIDTH TO THICKNESS RATIO OF AT LEAST 20:1

104 COVER A CENTRAL PORTION OF THE STRIP WITH A DIELECTRIC MATERIAL AND LEAVE DISTAL PORTIONS AT EACH END EXPOSED

106 FOLD A DISTAL PORTION BACK ONTO ITSELF, THEREBY FORMING AN INTEGRAL BLADE-TYPE MALE TERMINAL

108 FOLD A DISTAL PORTION SUCH THAT IT DEFINES TWO PARALLEL TABS EXTENDING FROM THE DISTAL END

FIG. 12

FLEXIBLE ELECTRICAL BUS BAR AND METHOD OF MANUFACTURING THE SAME

CROSS-REFERENCE TO RELATED APPLICATIONS

This application is a continuation of U.S. application Ser. No. 17/592,701, filed on Feb. 4, 2022, which claimed priority to U.S. Provisional Application No. 63/146,050, filed on Feb. 5, 2021, the content of each of which is hereby incorporated herein by reference in its entirety.

SUMMARY

This application is directed to an electrical bus bar, particularly a flexible bus bar that is configured to be used in high voltage circuit applications, such as electric or hybrid electric vehicles.

According to one or more aspects of the present disclosure, an electrical bus bar assembly includes an elongate flexible electrical conductor formed of a strip of electrically conductive material having a generally rectangular cross section and a width to thickness ratio of at least 20:1 and a dielectric material covering a central portion of the electrical conductor such that the electrical conductor has exposed distal portions at each end of the assembly.

In one or more embodiments of the electronic assembly according to the previous paragraph, the electrical bus bar assembly, one of the exposed portions is folded back onto itself to form an integral blade-type male terminal.

In one or more embodiments of the electrical bus bar assembly according to any one of the previous paragraphs, the male terminal is formed of at least two layers of the electrically conductive material.

In one or more embodiments of the electrical bus bar assembly according to any one of the previous paragraphs, a leading edge of a free end of the male terminal has a rounded edge.

In one or more embodiments of the electrical bus bar assembly according to any one of the previous paragraphs, a width of the male terminal is less than a width of the electrical conductor covered by the dielectric material.

In one or more embodiments of the electrical bus bar assembly according to any one of the previous paragraphs, a thickness of the male terminal is greater than a thickness of the central portion of the electrical conductor.

In one or more embodiments of the electrical bus bar assembly according to any one of the previous paragraphs, the flexible electrical conductor may be bent by a force of less than 5 newtons.

In one or more embodiments of the electrical bus bar assembly according to any one of the previous paragraphs, the male terminal extends beyond the width of the central portion of the electrical conductor.

In one or more embodiments of the electrical bus bar assembly according to any one of the previous paragraphs, the thickness of the electrical conductor is in a range of 0.1 millimeters to 0.5 millimeters.

In one or more embodiments of the electrical bus bar assembly according to any one of the previous paragraphs, one of the exposed distal portions defines two parallel tabs extending from the bus bar and wherein the two tabs are configured to be welded to two different parallel sides of an electrical terminal.

According to one or more aspects of the present disclosure, a method of manufacturing an electrical bus bar assembly includes the steps of forming a flexible strip from an electrically conductive sheet such that the strip has a generally rectangular cross section with a width to thickness ratio of at least 20:1 and covering a central portion of the strip with a dielectric material and leaving distal portions at each end exposed.

In one or more embodiments of the method according to the previous paragraph, the method further comprises the step of folding a distal portion back onto itself, thereby forming an integral blade-type male terminal.

In one or more embodiments of the method according to any one of the previous paragraphs, the male terminal is formed of at least two layers of the strip.

In one or more embodiments of the method according to any one of the previous paragraphs, the distal portion is folded such that a leading edge of a free end of the male terminal defines a rounded edge.

In one or more embodiments of the method according to any one of the previous paragraphs, a width of the male terminal is less than a width of the strip.

In one or more embodiments of the method according to any one of the previous paragraphs, a thickness of the male terminal is greater than a thickness of the central portion of the strip.

In one or more embodiments of the method according to any one of the previous paragraphs, the strip may be bent by a force of less than 5 newtons.

In one or more embodiments of the method according to any one of the previous paragraphs, the male terminal extends beyond the width of the central portion of the strip.

In one or more embodiments of the method according to any one of the previous paragraphs, the thickness of the strip is in a range of 0.1 millimeters to 0.5 millimeters.

In one or more embodiments of the method according to any one of the previous paragraphs, the method further includes the step of folding a distal portion such that it defines two parallel tabs extending from the distal end.

DESCRIPTION OF THE DRAWINGS

The present invention will now be described, by way of example with reference to the accompanying drawings, in which:

FIG. 12 is a flow chart of a method of manufacturing an electrical bus bar assembly according to some embodiments.

DETAILED DESCRIPTION

Figure 1:
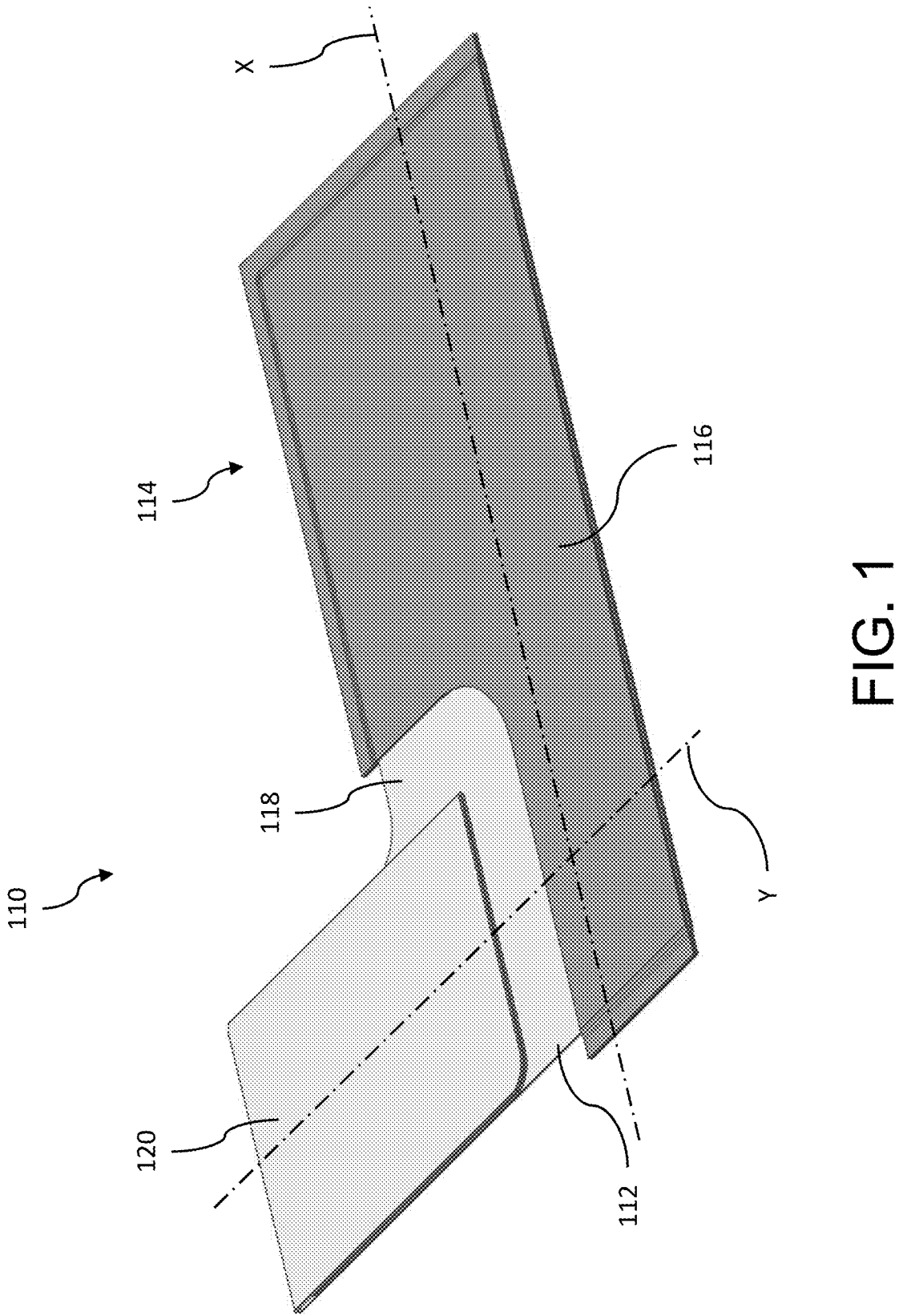
FIG. 1 is a perspective top view of an electrical bus bar assembly with an integral blade-type male terminal according to some embodiments.

The electrical bus bar assembly, hereinafter referred to as the bus bar 110, shown in FIG. 1 is formed of a thin strip 112 of electrically conductive material, such as copper or aluminum. The strip 112 is flexible, meaning that it can be bent by its own weight or by a force of less than 5 newtons. The strip 112 has a generally rectangular cross section with a width to thickness ratio of at least 20:1. This width to thickness ratio may be higher, e.g., 60:1. The high width to thickness ratio of the strip 112 provides improved heat dissipation from the bus bar 110 compared to round wires or rigid bust bars. A central portion 114 of the strip 112 is covered or encased within a thin layer of an electrically insulative dielectric material 116, e.g., polyvinyl chloride, fluorinated ethylene propylene, tetrafluoroethylene, or poly-tetrafluoroethylene, leaving the ends or distal portions 118 of the strip exposed. The dielectric material 116 is preferably also flexible. The strip 112 can be made from a wide single layer or a plurality of narrower layers. In some embodiments, the strip 112 has a width of 10 to 30 millimeters and a thickness of 0.1 to 0.5 millimeters.

Figure 2:
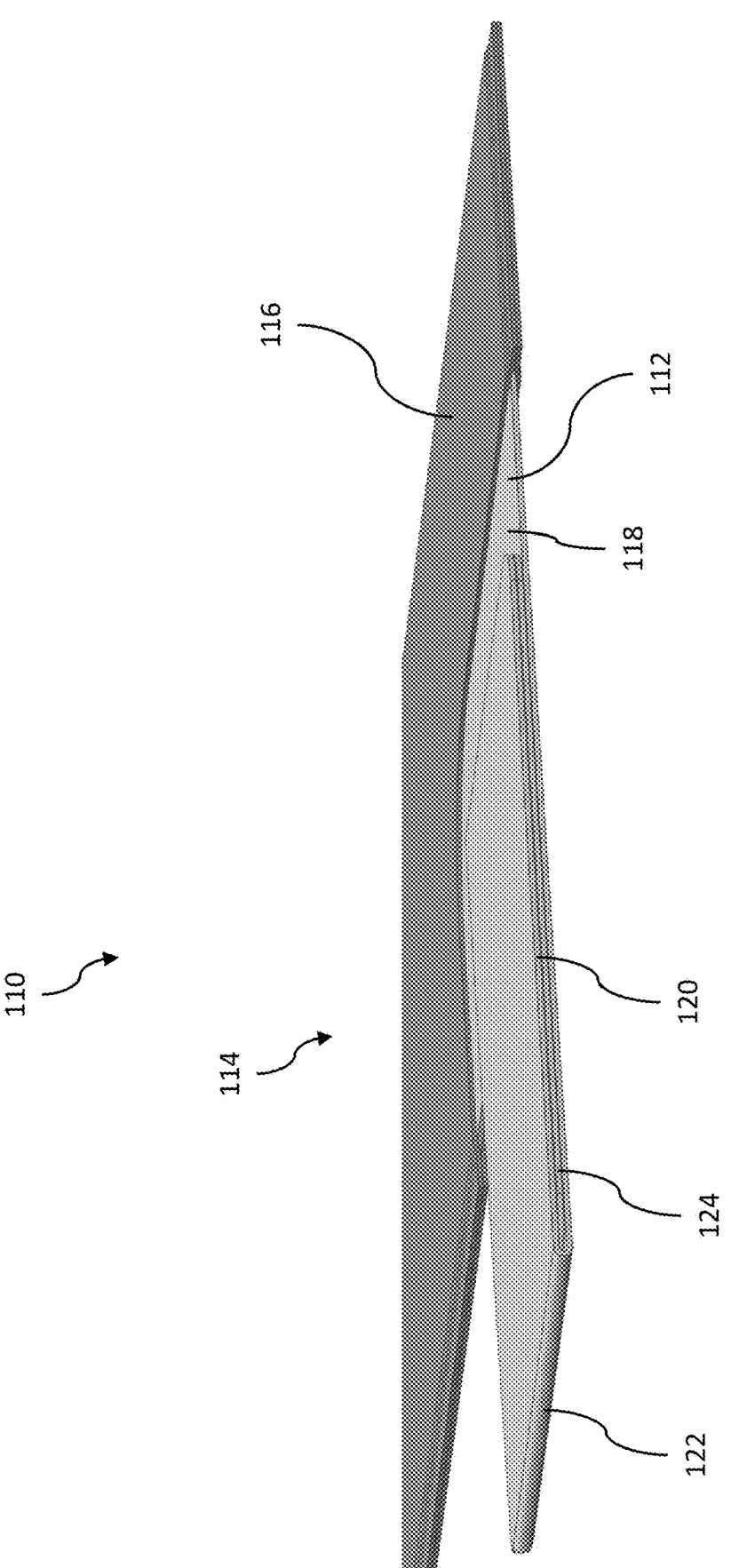
FIG. 2 is a perspective side view of the electrical bus bar assembly of FIG. 1 according to some embodiments.
Figure 3B:
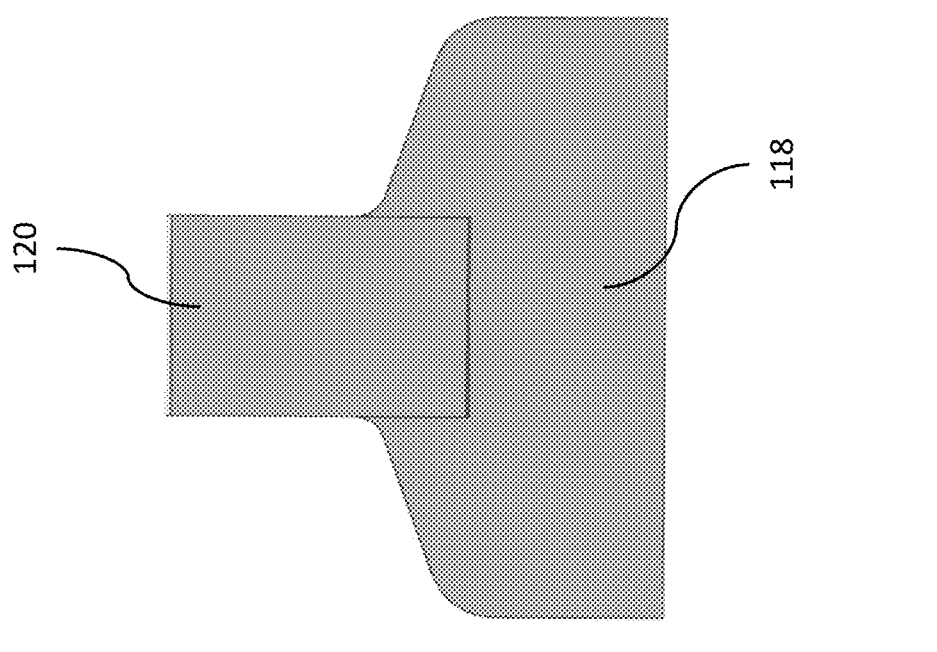
FIG. 3B is a top view of the electrical bus bar assembly of FIG. 3A according to some embodiments.
Figure 3A:
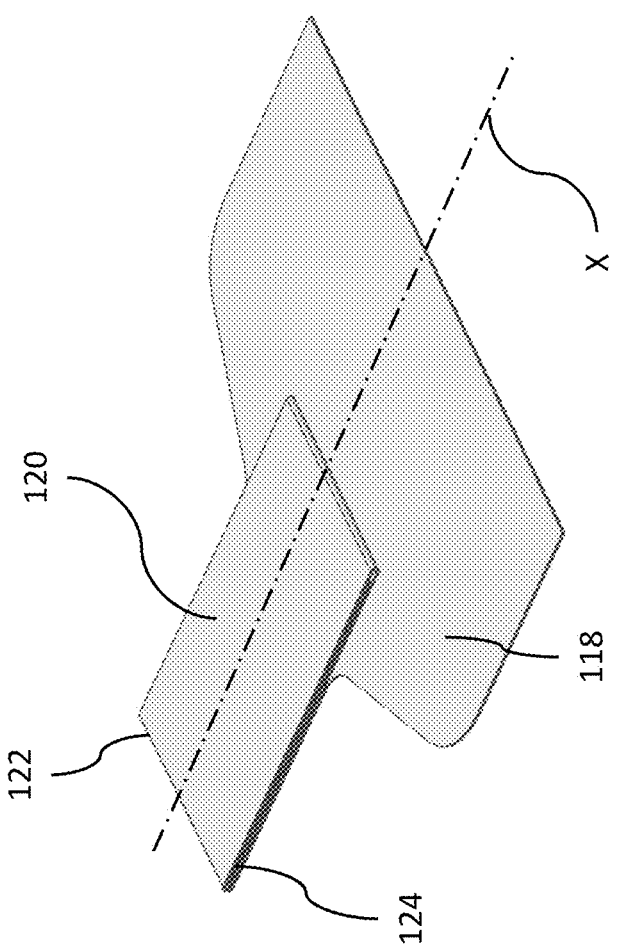
FIG. 3A is a perspective view of an electrical bus bar assembly with an integral blade-type male terminal according to some embodiments.
Figures 4A, 4B:
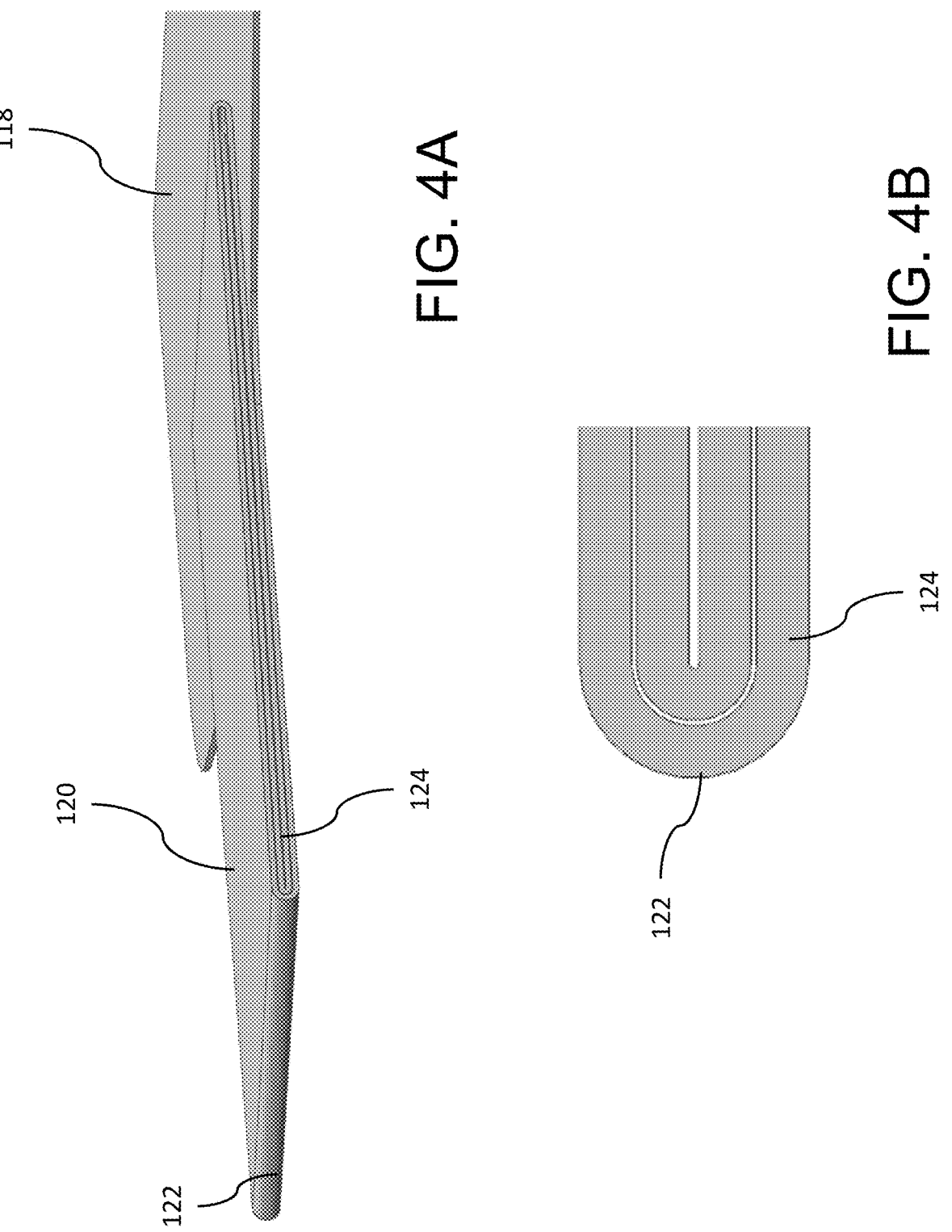
FIG. 4A is a perspective side view of the integral blade-type male terminal of the electrical bus bar assembly of FIG. 3A according to some embodiments.
FIG. 4B is an enlarged side view of the integral blade-type male terminal of FIG. 4A according to some embodiments.

The exposed distal portions 118 of the strip 112 may be folded back onto themselves to integrally form a blade-type male terminal 120 that can be received within and make electrical connection with a female socket terminal (not shown). As shown in FIG. 2, the strip 112 is folded so that a leading edge 122 of the free end 124 of the male terminal 120 has a rounded shape that mimics the coined edge of a typical male blade terminal. As shown in FIGS. 1 and 2, the male terminal 120 may extend from the strip 112 along a lateral axis Y that is orthogonal to a longitudinal axis X of the strip 112. Alternatively, as shown in FIGS. 3A-4B, the terminal 120 may extend from the strip 112 in a direction parallel with the longitudinal axis X of the strip 112.

Figure 5C:
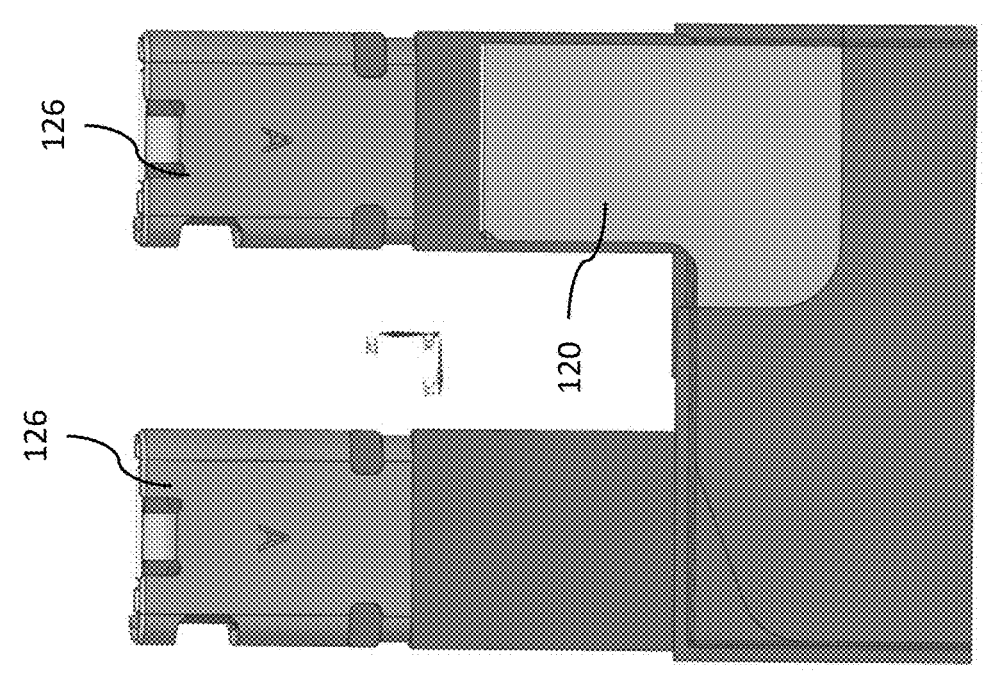
FIG. 5C is a top view an electrical connector assembly including the electrical bus bar assembly of FIG. 1 according to some embodiments.
Figure 5A:
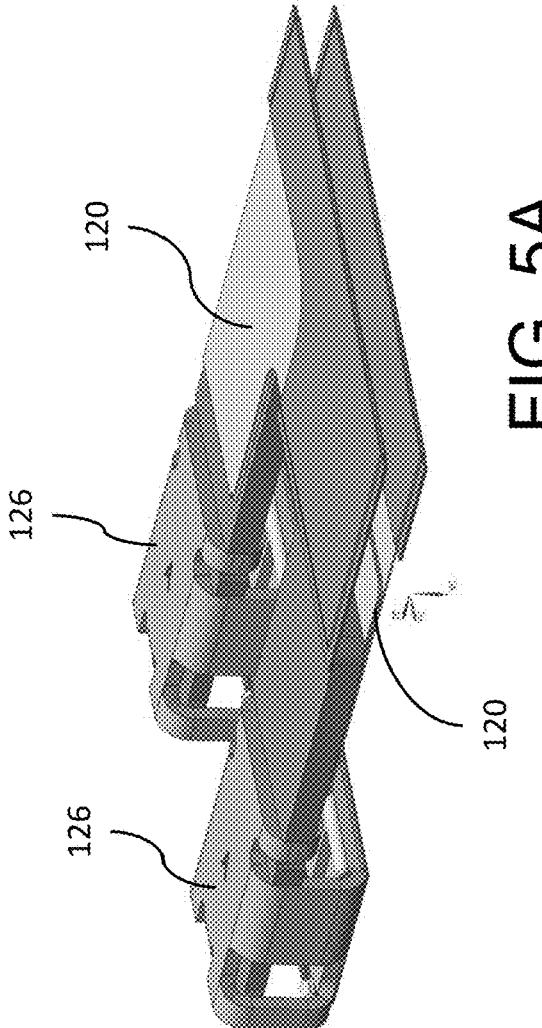
FIG. 5A is a perspective view an electrical connector assembly including the electrical bus bar assembly of FIG. 1 according to some embodiments.
Figure 5B:
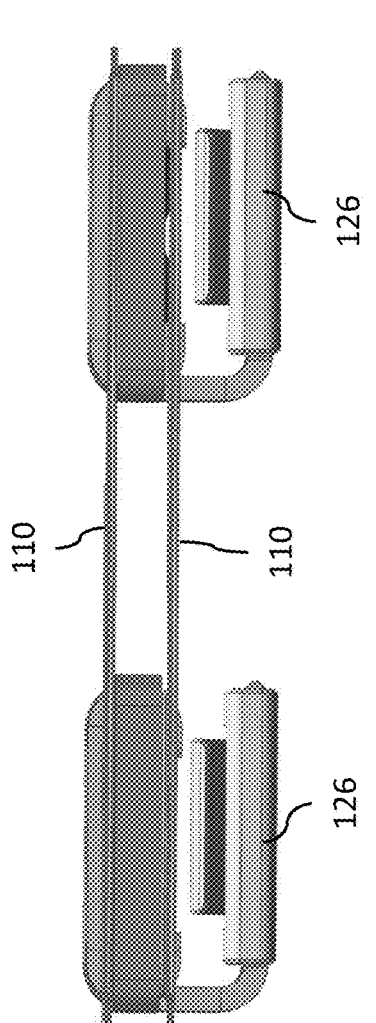
FIG. 5B is a side view an electrical connector assembly including the electrical bus bar assembly of FIG. 1 according to some embodiments.

The male terminal 120 may instead be used as a weld pad to connect the bus bar 110 to a separate electrical terminal 126 using a welding process, such as resistance, sonic, or laser welding as shown in FIGS. 5A, 5B, and 5C. The attached terminal 126 may be a simple male blade terminal or a multipiece female socket terminal. As illustrated in FIGS. 5A, 5B, and 5C, multiple terminals 126 and bus bars 110 may be attached so that the bus bars 110 are arranged parallel to one another and the weld pads of the male terminal 120 may be connected to opposite side of the terminals 126 to provide a compact terminal/bus bar assembly. The thickness of the dielectric material 116 may be tuned to provide proper creepage protection between the bus bars 110. Alternatively, or in addition, clearance paths or insulative separators (not shown) may be installed between the bus bars 110.

Figures 6A, 6B, 6C:
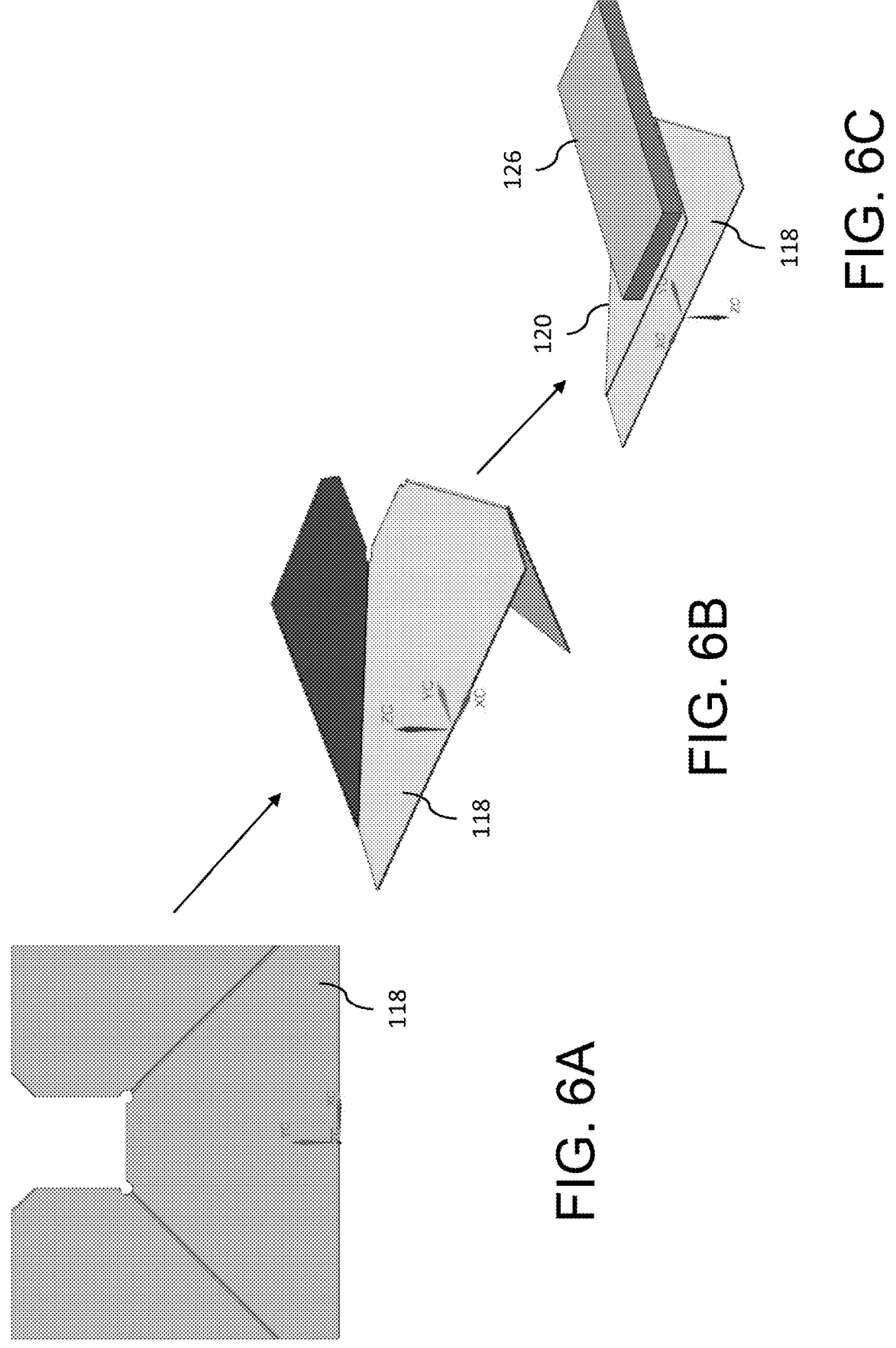
FIG. 6A is perspective view of a weld pad terminal of an electrical bus bar assembly in an initial step of assembly according to some embodiments.
FIG. 6B is perspective view of a weld pad terminal of an electrical bus bar assembly in a subsequent step of assembly according to some embodiments.
FIG. 6C is perspective view of a weld pad terminal of an electrical bus bar assembly in final step of assembly according to some embodiments.
Figure 7:
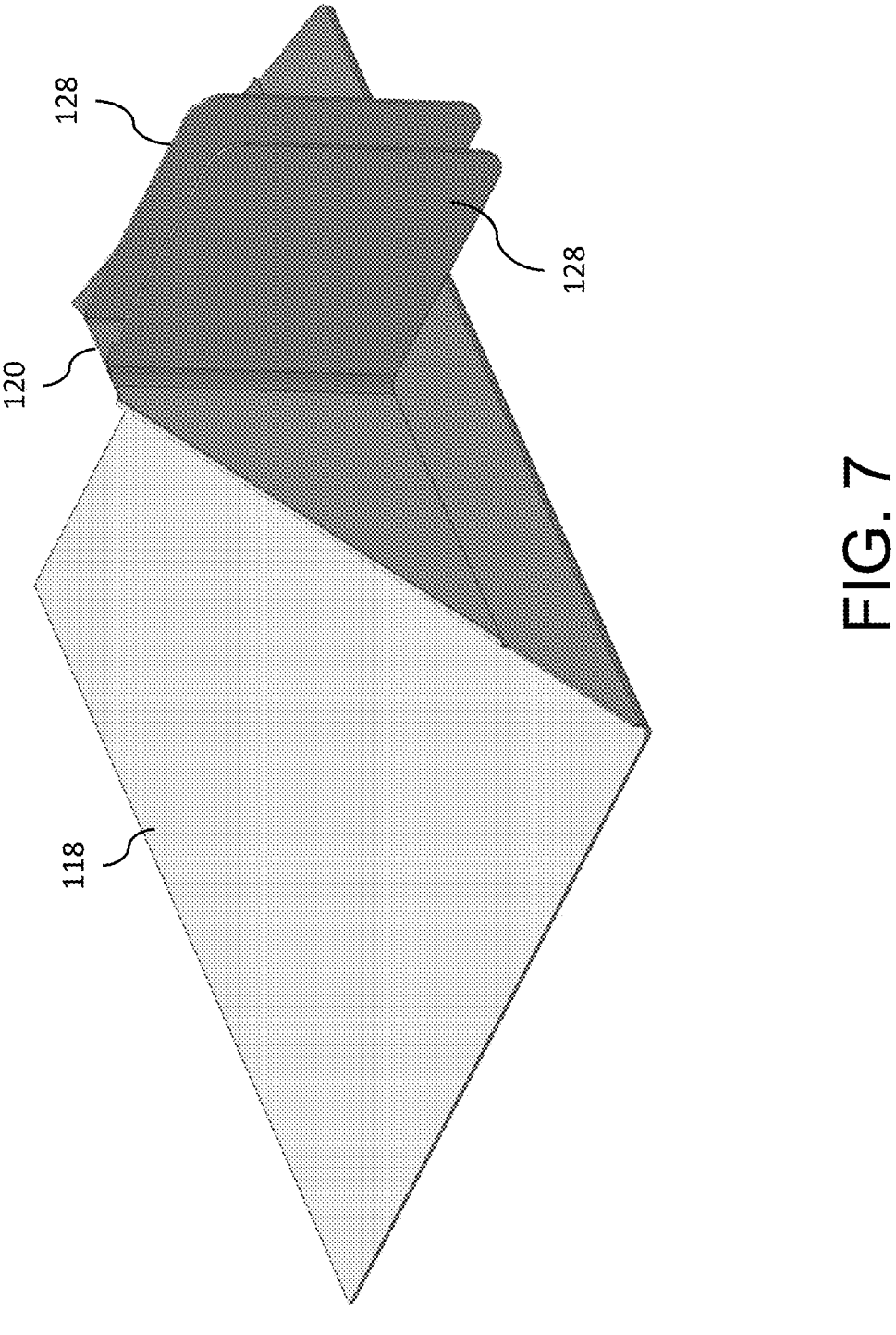
FIG. 7 is a perspective view of a terminal of an electrical bus bar assembly having parallel tabs according to some embodiments.
Figure 8:
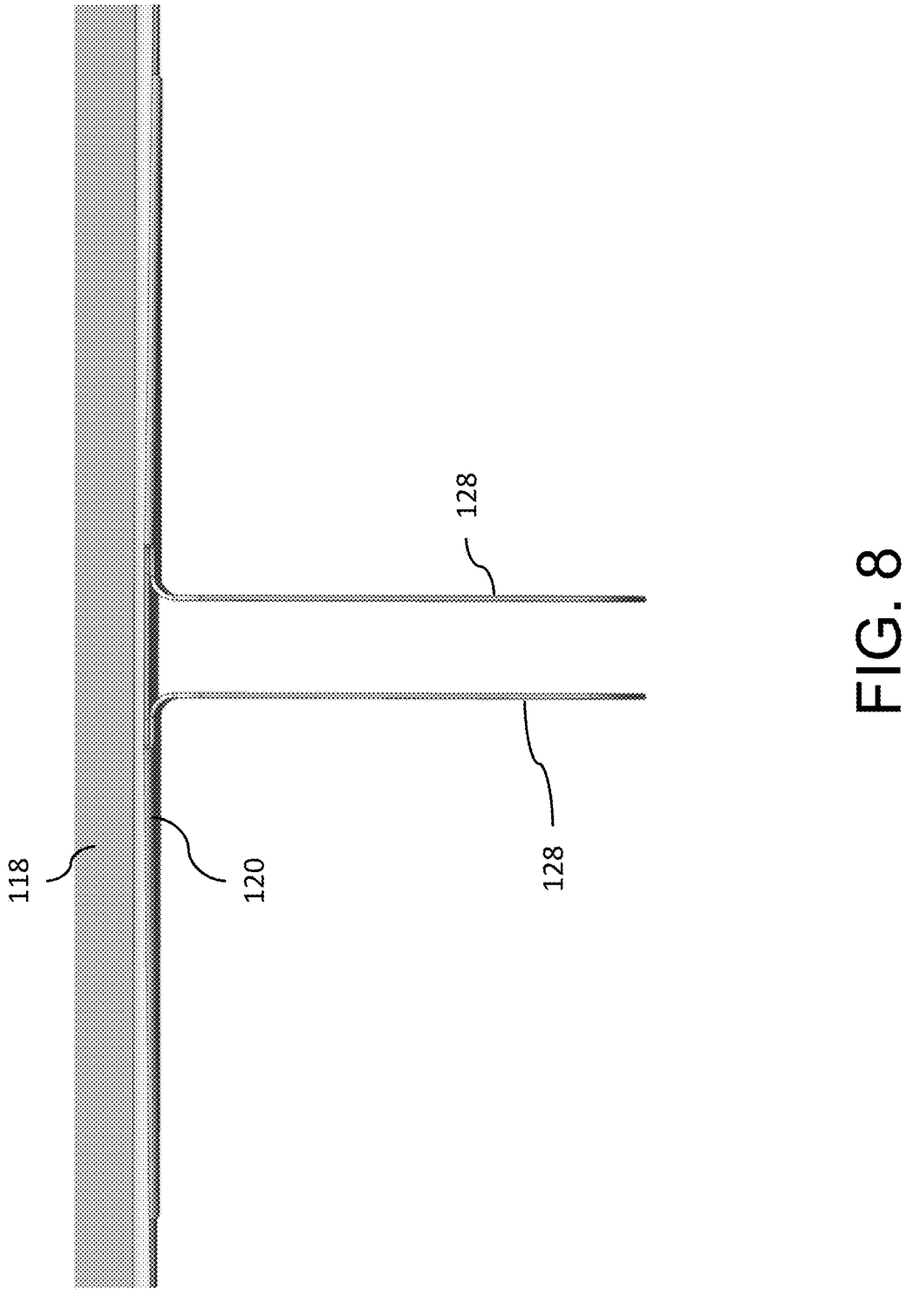
FIG. 8 is a top view of the terminal of FIG. 7 according to some embodiments.
Figure 9B:
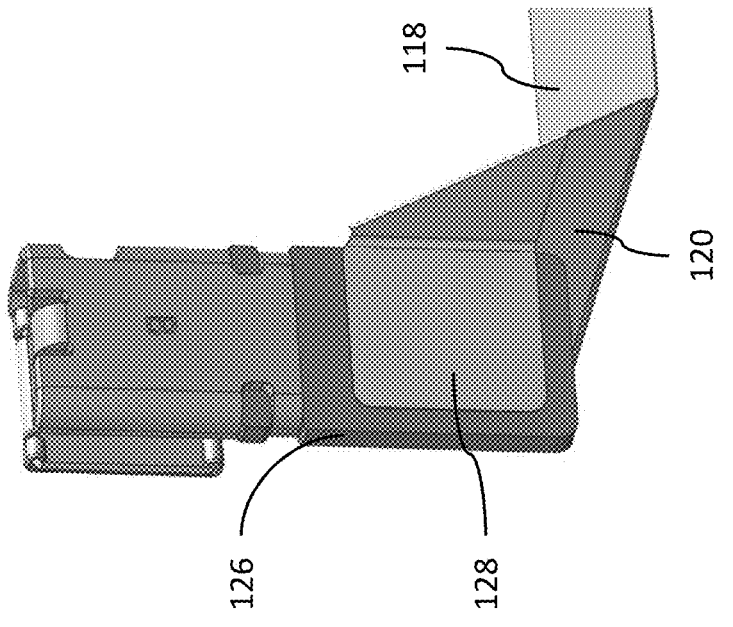
FIG. 9B is another perspective view of the terminal of FIG. 7 with the parallel tabs attached to parallel sides of an electrical terminal according to some embodiments.
Figure 9A:
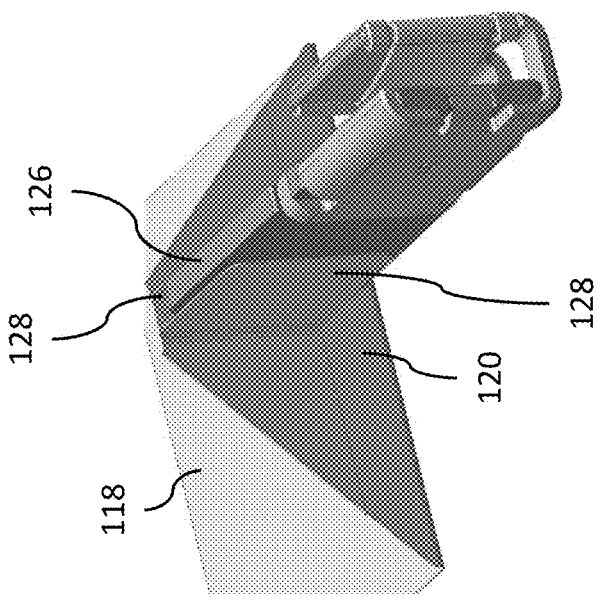
FIG. 9A is a perspective view of the terminal of FIG. 7 with the parallel tabs attached to parallel sides of an electrical terminal according to some embodiments.
Figure 10:
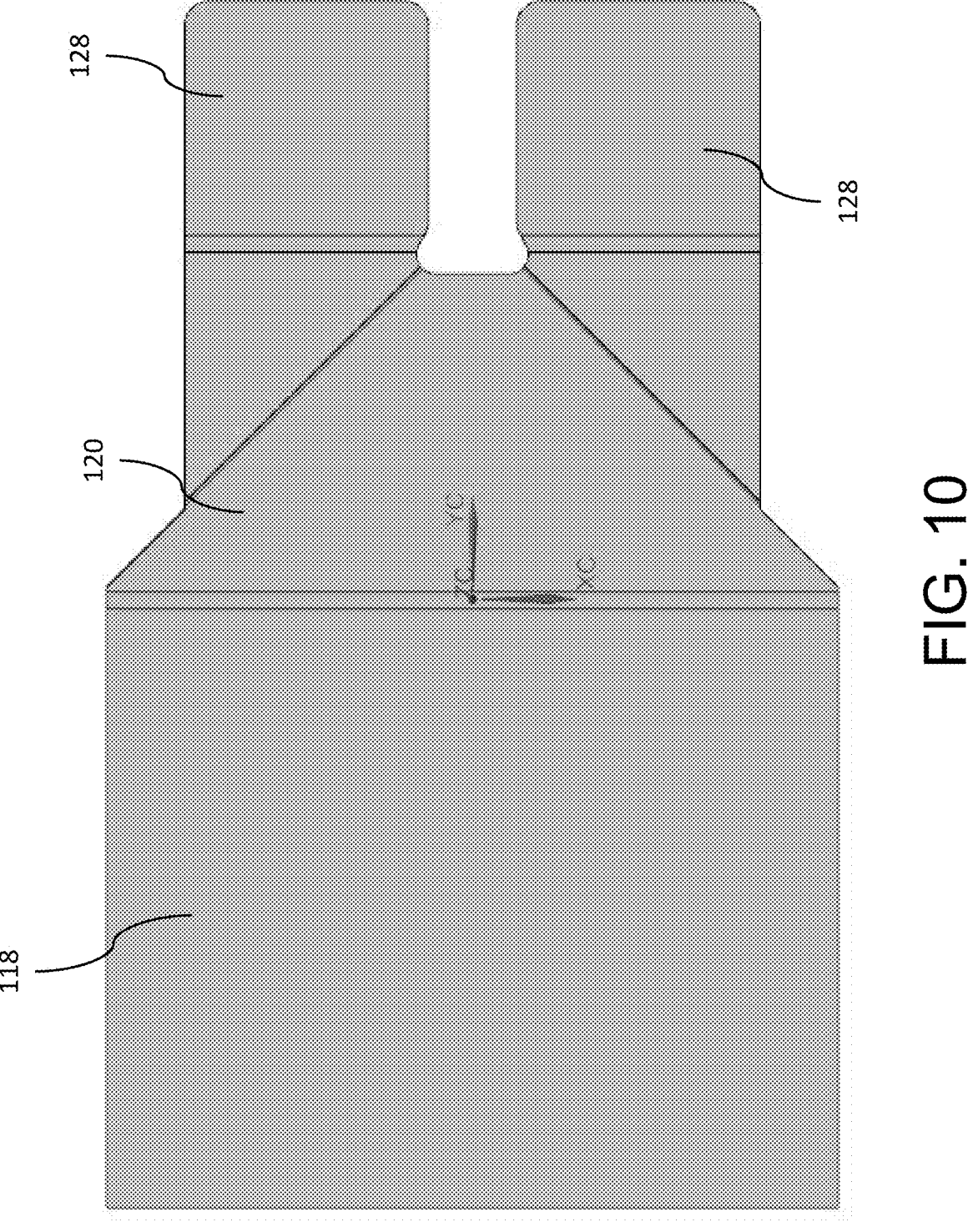
FIG. 10 is a top view of a preform of the terminal of FIG. 7 according to some embodiments.
Figure 11:
FIG. 11 is a perspective view of the preform of FIG. 10 according to some embodiments.

FIGS. 6A, 6B, and 6C illustrate an alternative weld pad design in which the strip is folded so that the weld pad of the male terminal 120 had an increased thickness relative to the strip 112.

FIGS. 7, 8, 9, 10, and 11 illustrate another alternative weld pad design having two parallel tabs 128 that are welded to two parallel surfaces on an electrical terminal 126. The weld pad of the male terminal 120 is folded multiple times to provide this shape. This weld pad design allows for a gradual reduction of the cross section of the bus bar from the strip 112 to the terminal 126. This weld pad design may be used in an axial orientation as shown in FIG. 9A or in a right-angled configuration as shown in FIG. 9B.

The process of coating the strip 112 with the dielectric material 116 presents opportunities for improving termination and routing/bending with combined metal shapes within the bus bar.

Vertically stacking multiple bus bar assemblies is possible, and the bus bar can be specified to have parallel path conductors with a perforated section between them to aid folding and processed of a stacked configuration.

Perforations or holes may be made in the strip to aid in the folding and stamping of the terminal concepts described above. Similar holes or relief cuts can provide locations for connection system features such as primary locks, independent secondary locks, terminal position assurance devices, primary lock retainers, or strain relief features. Features can also be created in the strip to allow for terminal springs to be attached and provide contact normal force for an electrical connection.

Because there may be packaging limitations on how wide the bus bar can be for a given application, multiple bus bars may be stacked vertically. Stacking the bus bars vertically may cause cross-heating between the layers, thereby derating the current carrying capability. In order to address this cross-heating issue, a channel assembly may be incorporated into the bus bar assembly that will both provide benefits for routing and protection of the bus bar but may also be configured to act as a heat sink. Multiple materials have been considered, such as an extruded aluminum channel that can also provide electromagnetic shielding, a thermally conductive plastic channel, or a silicone paste, adhesive strip, or 2-shot epoxy/potting to provide a thermal conduction path. This channel can sink heat to the atmosphere, conduct heat to the vehicle body, or provide internal channels for a coolant fluid flow to pull heat away from the bus bar.

A method 100 of manufacturing an electrical bus bar assembly, such as bus bar 110, is shown in the flow chart of FIG. 12. The various steps of the method 100 are outlined below:

STEP 102, FORM A FLEXIBLE STRIP FROM AN ELECTRICALLY CONDUCTIVE SHEET SUCH THAT THE STRIP HAS A GENERALLY RECTANGULAR CROSS SECTION WITH A WIDTH TO THICKNESS RATIO OF AT LEAST 20:1, includes forming a flexible strip 112 from an electrically conductive sheet such that the strip 112 has a generally rectangular cross section with a width to thickness ratio of at least 20:1;

STEP 104, COVER A CENTRAL PORTION OF THE STRIP WITH A DIELECTRIC MATERIAL AND LEAVE DISTAL PORTIONS AT EACH END EXPOSED, includes covering a central portion 114 of the strip 112 with a dielectric material 116 and leaving distal portions 118 at each end exposed;

STEP 106, FOLD A DISTAL PORTION BACK ONTO ITSELF, THEREBY FORMING AN INTEGRAL BLADE-TYPE MALE TERMINAL, includes folding a distal portion 118 back onto itself, thereby forming an integral blade-type male terminal 120 as shown in FIGS. 3A, 3B, 4A, and 4B; and STEP 108, FOLD A DISTAL PORTION SUCH THAT IT DEFINES TWO PARALLEL TABS EXTENDING FROM THE DISTAL END, includes folding a distal portion 118 such that it defines two parallel tabs 128 extending from the distal portion 118.

Accordingly, a flexible bus bar 110 suited for high power, i.e., high voltage/current applications, and a method 100 for manufacturing such a bus bar assembly is provided. The bus bar 110 and the method 100 provide the benefit of a flexible electrical circuit conductor that can be easily routed, e.g., in an automobile wiring system. The bus bar 110 and the method 100 also provide the benefit of better heat dissipation than traditional round wires or rigid bus bars.

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the disclosed embodiment(s), but that the invention will include all embodiments falling within the scope of the appended claims.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

The invention claimed is:

1. An electrical bus bar assembly, comprising:
   an elongate flexible electrical conductor formed of a strip of electrically conductive material having a distal portion defining two parallel tabs extending from the electrical conductor; and
   an electrical terminal having two different parallel sides disposed between the two parallel tabs, the two parallel tabs are integrally formed from the same flexible conductor and are configured to engage opposite parallel sides of the electrical terminal.

2. The electrical bus bar assembly according to claim 1, wherein the two parallel tabs are welded to the two different parallel sides of the electrical terminal.

3. The electrical bus bar assembly according to claim 1, wherein the two parallel tabs are formed of at least two layers of the electrically conductive material.

4. The electrical bus bar assembly according to claim 1, wherein leading edges of a free end of the two parallel tabs have a rounded edge.

5. The electrical bus bar assembly according to claim 1, wherein a thickness of the two parallel tabs is greater than a thickness of the central portion of the flexible electrical conductor.

6. The electrical bus bar assembly according to claim 1, wherein the strip of electrically conductive material has a generally rectangular cross section and a width to thickness ratio of at least 20:1.

7. A method of manufacturing an electrical bus bar assembly, comprising:
   forming a flexible strip from an electrically conductive sheet;
   folding a portion of the flexible strip such that it defines two parallel tabs integrally formed from the same flexible strip extending from a distal portion of the flexible strip; and
   inserting an electrical terminal having two different parallel sides so that the two parallel tabs respectively engage opposite sides of the electrical terminal.

8. The method according to claim 7, wherein the method further comprises welding the two parallel tabs to the two different parallel sides of the electrical terminal.

9. The method according to claim 7, wherein the method further comprises applying a dielectric material to the flexible strip, thereby covering a central portion of the flexible strip, wherein the dielectric material does not cover the distal portion.

10. The method according to claim 9, wherein a thickness of the two parallel tabs is greater than a thickness of the central portion of the flexible strip.

11. The method according to claim 9, wherein the two parallel tabs extend beyond a width of the central portion of the flexible strip.

12. The method according to claim 7, wherein the two parallel tabs are formed of at least two layers of the flexible strip.

13. The method according to claim 7, wherein the distal portion is folded such that leading edges of free ends of the two parallel tabs define rounded edges.

14. The method according to claim 7, wherein a width of the two parallel tabs is less than a width of the flexible strip.

15. The method according to claim 7, wherein the strip has a generally rectangular cross section and a width to thickness ratio of at least 20:1.

* * * * *